United States Patent [19]

Berger et al.

[11] 4,192,772

[45] Mar. 11, 1980

[54] SOLID CATALYST AND PROCESS FOR THE PREPARATION THEREOF

[75] Inventors: Eugene Berger, Brussels; Charles Bienfait, Keerbergen, both of Belgium

[73] Assignee: Solvay & Cie, Brussels, Belgium

[21] Appl. No.: 893,517

[22] Filed: Apr. 4, 1978

Related U.S. Application Data

[62] Division of Ser. No. 675,320, Apr. 9, 1976, Pat. No. 4,109,071.

[30] Foreign Application Priority Data

Apr. 14, 1975 [LU] Luxembourg .......................... 72278

[51] Int. Cl.$^2$ .............................................. C08F 4/64
[52] U.S. Cl. ............................ 252/429 C; 252/431 R
[58] Field of Search ........................ 252/429 C, 431 R

[56] References Cited

U.S. PATENT DOCUMENTS 3,678,025  7/1972  Birrell ..................... 252/429 C X
3,901,863  8/1975  Berger et al. ............. 252/429 C X

FOREIGN PATENT DOCUMENTS 2324766  1/1974  Fed. Rep. of Germany .
1309987  3/1973  United Kingdom .

OTHER PUBLICATIONS

Lapporte et al., J. Org. Chem., 28 (Jul., 1963), pp. 1947–1948.

*Primary Examiner*—Patrick Garvin
*Attorney, Agent, or Firm*—Pennie & Edmonds

[57] ABSTRACT

Catalyst systems for the polymerization and copolymerization of α-olefins, as well as process for making and using the same, which comprises an organo-metallic compound of a metal of Groups Ia, IIa, IIb, IIIb and IVb of the Periodic Table and a solid catalyst complex formed by reacting together at least one compound selected from organo oxygen-containing and halogen-containing compounds of each of the metals of magnesium, titanium and zirconium and at least one aluminum halide.

20 Claims, No Drawings

SOLID CATALYST AND PROCESS FOR THE PREPARATION THEREOF

This is a division of application Ser. No. 675,320 now U.S. Pat. No. 4,109,071, filed Apr. 9, 1976.

BACKGROUND OF THE INVENTION

The present invention relates to an improved process for the polymerization of alpha-olefins as well as to catalyst systems comprising solid complexes which can be used for the polymerization of alpha-olefins, a process for preparing these solid complexes and the polymers obtained by means of the process of the invention.

It is known to use catalyst systems comprising a transition metal compound and an organo-metallic compound for the low pressure polymerization of olefins. Belgium Pat. No. 791,676 of Nov. 21, 1972, describes catalyst systems of which one constituent is obtained by reacting, with one another, (1) an oxygen-containing organic compound (M) of a metal, such as a magnesium phenate or a magnesium alcoholate, (2) an oxygen-containing organic compound (T) of a transition metal and (3) an aluminum halide (A). These catalyst systems possess the extremely important advantages of having very high activity and productivity while their preparation is extremely simple and does not lead to any contaminating by-product. Finally, and above all, the polymer obtained has very good morphological properties which makes it possible to carry out a continuous suspension polymerization with a very high polymer content and, hence, a very low relative amount of diluent which normally requires treatment before recycling.

Because of the above advantages, it would thus be highly desirable to be able to use the catalyst systems such as described in Belgium Pat. No. 791,676, for the manufacture of all types of polymers. However, these systems are difficult to use for the manufacture of polyolefins having a wide molecular weight distribution. In fact, to form such polyolefins, it is essential either to use catalyst systems wherein the atomic ratio of transition metal/metal of compound (M) is low or to carry out the polymerization with a relatively high concentration of hydrogen. The first method gives rise to considerable difficulties in the preparation of the catalyst system and therefore, loses the advantages mentioned above. The second method results in a rise in the melt index of the polymer and therefore, also cancels out the advantages desired. Further, this latter method results in an excessively large decrease in the productivity of the catalyst system.

A large proportion of polyolefins produced by low pressure polymerization are used in processes, such as extrusion and extrusion blowing, which require the polymer to have a wide molecular weight distribution. A catalyst system is, therefore, desired which is capable of readily producing polyolefins having wide molecular weight distribution and which has all of the essential advantages of the above mentioned system.

SUMMARY OF THE INVENTION

It has now been discovered that by using the novel solid catalyst complex of the present invention one readily obtains polyolefins with a very wide molecular weight distribution without losing any of the essential advantages of the previously known catalyst complexes of this family of catalyst systems.

The present invention relates to the polymerization of α-olefins with a catalytic system comprising (a) an organo-metallic compound and (b) a solid catalyst complex formed by reacting together at least one compound selected from organo oxygen-containing or halide containing compounds of each of the metals of magnesium, titanium and zirconium and at least one aluminum halide; said reactants are used in amounts which satisfy the equation $$(Zr/Ti).(X/Mg+Zr+Ti) > 3$$

in which Mg, Ti, Zr and X represent, in gm-equivalents, the amount of magnesium, titanium, zirconium and halogen of said reactants.

DETAILED DESCRIPTION OF THE INVENTION

The present invention relates to a process for the polymerization of alpha-olefins which is carried out in the presence of a catalyst system comprising an organo-metallic compound of a metal of Groups Ia, IIa, IIb, IIIb and IVb of the Periodic Table and a solid catalyst complex prepared by reacting, with one another:

(1) at least one magnesium compound (M) selected from the oxygen-containing organic compounds and the halogen-containing compounds of this metal, (2) at least one titanium compound (T) selected from the oxygen-containing organic compounds and the halogen-containing compounds of this metal, (3) at least one zirconium compound (Z) selected from the oxygen-containing organic compounds and the halogen-containing compounds of this metal and (4) at least one aluminum halide (A). It is essential to employ at least one of each of these essential compounds (M), (T), (Z) and (A). The amounts of said compound must be such that they satisfy the equation $$(Zr/Ti).(X/Mg+Zr+Ti) > 3$$

where Mg, Zr, Ti and X represent the amounts, expressed in gram equivalents, of magnesium, zirconium, titanium and halogen employed.

The solid catalyst complexes used in the present invention are prepared from the reactants (1), (2) and (3), which are respectively, the magnesium compound (M), the titanium compound (T) and the zirconium compound (Z), selected from the oxygen-containing organo compounds and the halogen-containing compounds of these metals.

The term "oxygen-containing organic compounds" is intended to denote all the compounds wherein any organic radical is linked to the metal via oxygen, that is to say all the compounds which contain at least one metal-oxygen-organic radical sequence of bonds per atom of metal. The organo radicals linked to the metal via the oxygen may be of any type. They are preferably selected from the radicals containing from 1 to 20 carbon atoms and more particularly from radicals containing from 1 to 10 carbon atoms. The best results are obtained if these radicals contain from 2 to 6 carbon atoms. These radicals can be saturated or unsaturated, have a branched chain or straight chain or be cyclic. They can also be substituted or contain hetero-atoms, such as silicon, sulphur, nitrogen or phosphorus, in their chain. Preferably the radicals are chosen from hydrocarbon radicals and in particular from alkyl (linear or branched), alkenyl, aryl, cycloalkyl, arylalkyl, alkylaryl and acyl radicals and their substituted derivatives.

The term "halogen-containing compounds" is intended to denote all the compounds which contain at least one metal to halogen bond. The halogen linked to the metal may be fluorine, chlorine, bromine or iodine. Preferably, the halogen is chlorine.

Amongst all the oxygen-containing organic compounds and halogen-containing compounds which are suitable, it is preferred to use those which only contain metal-oxygen-organic radical bonds and/or metal-halogen bonds, no other bonds being present. The best results are obtained with compounds which only contain metal-oxygen-alkyl radical bonds and/or metal-chlorine bonds.

The solid catalyst complexes used in the present invention are prepared from reactants (1) which are magnesium compounds (M).

The oxygen-containing organic compounds (M) can contain other radicals in addition to the organic radicals linked to the magnesium via oxygen. These other radicals are preferably oxygen and inorganic radicals linked to the metal via oxygen, such as the —OH, —(SO$_4$)$_{\frac{1}{2}}$, —NO$_3$, —(PO$_4$)$_{\frac{1}{3}}$, —(CO$_3$)$_{\frac{1}{2}}$ and —ClO$_4$ radicals. Other possible radicals are organic radicals linked directly to the magnesium by carbon.

Compounds (M) falling within the family of oxygen-containing organic compounds, which may be mentioned include: the magnesium alkoxides, such as, for example, methylate, ethylate, isopropylate, decanolate and cyclohexanolate; the magnesium alkyl-alkoxides, such as, for example, ethylethylate; magnesium hydroxyalkoxides, such as, for example, hydroxymethylate; the magnesium phenoxides, such as, for example, phenate, napthenate, anthracenate, phenanthrenate and cresolate; the magnesium carboxylates (which may be hydrated), such as, for example, acetate, stearate, benzoate, phenylacetate, adipate, sebacate, phthalate, acrylate and oleate; the oxygen-containing organic compounds of magnesium which also contain nitrogen, that is to say compounds which contain magnesium-oxygen-nitrogen-organic radical bond sequences, such as the oximates, in particular, butyloximate, dimethylglyoximate and cyclohexyloximate, salts of hydroxamic acids and salts of hydroxylamines, in particular the derivative of N-nitroso-N-phenyl-hydroxylamine; the magnesium chelates, that is to say the oxygen-containing organic compounds in which the magnesium possesses at least one sequence of normal bonds of the magnesium-oxygen-organic radical type and at least one coordination bond, so as to form a heterocyclic ring in which the magnesium is included, such as the enolates and in particular the acetylacetonate, as well as the complexes obtained from phenolic derivatives which possess an electron donor group, for example, in the ortho-position relative to the hydroxyl group, and in particular 8-hydroxyquinolinate; and the magnesium silanolates, that is to say compounds which contain magnesium-oxygen-silicon-hydrocarbon radical bond sequences, such as, for example, triphenylsilanolate.

Of course, this series of oxygen-containing organic compounds also includes: the compounds which contain several different organic radicals such as, for example, magnesium methoxyethylate, the complex alkoxides and phenoxides of magnesium and another metal, such as, for example, Mg[Al(OR)$_4$]$_2$ and Mg$_3$[Al(OR)$_6$]$_2$, and mixtures of two or more of the oxygen-containing organic magnesium compounds defined above.

Amongst the halogen-containing magnesium compounds (M) there may be mentioned: the magnesium dihalides of the commercial type, which are usually referred to as "anhydrous" and which are in fact hydrated dihalides containing one molecule or less of water per molecule of dihalide, the "commercial anhydrous" magnesium dichlorides being a typical example of these compounds, the magnesium dihalides complexed by means of various electron donors, such as, for example, the complexes with ammonia, such as MgCl$_2$.6NH$_3$ and MgCl$_2$.2NH$_3$, and the complexes with alcohols such as MgCl$_2$.6CH$_2$OH, MgCl$_2$.6C$_2$H$_5$OH and MgCl$_2$.6C$_3$H$_7$OH; the hydrated magnesium dihalides containing more than one molecule of water per molecule of dihalide, such as, for example, MgCl$_2$.6H$_2$O, MgCl$_2$.4H$_2$O and MgCl$_2$.2H$_2$O; compounds which contain, in addition to the magnesium-halogen bond, an inorganic radical linked to the magnesium via oxygen, such as a hydroxyl radical, as, for example, Mg(OH)Cl and Mg(OH)Br; compounds which, in addition to the magnesium-halogen bond (preferably the magnesium-chlorine bond), contain a magnesium-organic radical bond, preferably a magnesium-hydrocarbon radical bond (as defined earlier), as, for example, Mg(C$_2$H$_5$)Cl and Mg(C$_6$H$_5$)Cl; the hydrolysis products of the hydrated magnesium halides (preferably chlorides), where these products still contain magnesium-halogen bonds; mixed compositions containing halogen-containing compounds and oxygen-containing compounds of magnesium, typical examples of these compositions being the basic magnesium halides (preferably chlorides), such as MgCl$_2$.MgO.H$_2$O, MgCl$_2$.3MgO.7H$_2$O and MgBr$_2$.3MgO.6H$_2$O; and mixtures of two or more of the halogen-containing magnesium compounds defined above.

Finally, it must, of course, be understood that the use of two or more compounds as defined above also falls within the scope of the present invention.

Equally, the use of magnesium compounds containing both a magnesium-halogen bond and an organic radical, as defined above, linked to the magnesium via oxygen, also forms part of the invention. The compounds of this type which give the best results are, it should be noted, the chloroalkoxides and the chlorophenoxides such as, for example, Mg(OCH$_3$)Cl, Mg(OC$_2$H$_5$)Cl and Mg(OC$_6$H$_5$)Cl.

The best results are obtained if the magnesium compound (M) is a dichloride, a dialkoxide or an alkoxychloride.

The reactants (2) used to prepare the catalyst complexes according to the invention are titanium compounds (T). It is preferred to use tetravalent titanium compounds because they are most frequently liquid and in any case more frequently soluble, as well as of better solubility, than those where the titanium has a valency less than 4.

The oxygen-containing organo compounds (T) of titanium which can be used as the reactants (2) include the types of compounds described above with respect to oxygen-containing organo compounds (M). Further, the oxygen-containing organic compounds (T) of titanium also includes the compounds containing titanium-oxygen bonds and the condensed compounds containing sequences of titanium-oxygen-titanium bonds provided that they also contain at least one titanium-oxygen-organic radical bond sequence per molecule.

The oxygen-containing organic compounds (T) can be represented by the general formula $[TiO_x(OR)_{4-2x}]_m$, where R is an organic radical as defined earlier and x is a number such that $0 \leq x \leq 1.5$, and m is any whole integer. It is preferred to use the oxygen-containing organic compounds (T) where x is such that $0 \leq x \leq 1$ and m is such that $1 \leq m \leq 6$.

The use of oxygen-containing organic compounds (T) containing several different organic radicals also falls within the scope of the present invention.

The oxygen-containing organic compounds (T), useful in the present invention include, for example: the alkoxides, such as $Ti(OC_2H_5)_4$, $Ti(OnC_3H_7)_4$, $Ti(OnC_4H_9)_4$, $Ti(OiC_4H_9)_4$ and $Ti(O-tertC_2H_5)_4$; the phenoxides, such as $Ti(OC_6H_5)_4$; the oxyalkoxides, such as $TiO(OC_2H_5)_2$; the condensed alkoxides, such as $Ti_2O(OiC_3H_7)_6$; and the enolates, such as titanium acetylacetonate.

The halogen-containing compounds (T) include: the tetrahalides, such as $TiCl_4$ and $TiBr_4$; the halides complexed by means of various electron donors, such as $TiCl_4.6NH_3$, $TiCl_4.2C_5H_5N$ and $TiCl_4.C_4H_8O_2$; the complex halides of titanium and an alkali metal, such as $K_2TiCl_6$ and $Na_2TiCl_6$; the oxyhalides, such as $TiOCl_2$; and the halogenoalkoxides, such as $Ti(OiC_4H_9)_2Cl_2$.

It should be clearly understood that the use of several different titanium compounds (T) also falls within the scope of the invention.

The best results are obtained when using titanium tetraalkoxides.

The reactants (3) employed to prepare the catalyst complexes used in the invention are zirconium compounds (Z). It is preferred to use tetravalent zirconium compounds because they are most frequently liquid and in any case more frequently soluble, and of better solubility then those where the zirconium has a valency less than 4.

Among the oxygen-containing organic compounds there may be mentioned the alkoxides, such as $Zr(OC_4H_9)_4$; the phenates, such as $Zr(OC_6H_5)_4$; the oxyalkoxides, such as $Zr[OzR(OC_2H_5)_3]_4$; the carboxylates, such as $Zr(CH_3COO)_4$ and $Zr(C_2O_4)_2$ and the enolates, such as zirconium acetylacetonate.

Among the halogen-containing compounds there may be mentioned: the halides, such as for example, $ZrF_4$ and $ZrCl_4$; the oxyhalides, which may be hydrated, such as $ZrOF_2$ and $ZrOCl_2.8H_2O$; the complex oxyhalides, such as $ZrOCl_2.ZrO_2$; the halides complexed with various electron donors such as, for example, the complexes with ammonia, such as $ZrCl_4.8NH_3$ and $ZrCl_4.4NH_3$ and the complexes with pyridine such as $ZrCl_4.4C_5H_5N$; and the alkoxyhalides such as, for example, $Zr(OC_4H_9)Cl_3$. The use of several different zirconium compounds (Z) also falls within the scope of the invention.

The best results are obtained with the tetraalkoxides, the tetrachlorides and the alkoxychlorides of tetravalent zirconium.

Finally, the solid catalyst complexes which can be used according to the present invention are prepared from reactants (4) which are aluminum halides (A). These are preferably chosen from among the aluminum halides of the general formula $AlR'_nX_{3-n}$, in which R' is a hydrocarbon radical containing from 1 to 20 carbon atoms and preferably from 1 to 6 carbon atoms, X is a halogen (fluorine, chlorine, bromine or iodine) and n is any number such that $0 \leq n < 3$, preferably $0 < n < 3$. More preferably, R' is chosen from amongst alkyl (linear or branched), cycloalkyl, arylalkyl, aryl and alkylaryl radicals. The best results are obtained if X represents chlorine and n is such that $1 < n < 2$ and most preferably such that $n = 1$.

As examples of aluminum halides which can be used according to the invention, there may be mentioned: $AlCl_3$, $Al(C_2H_5)Cl_2$, $Al_2(C_2H_5)_3Cl_3$ and $Al(C_2H_5)_2Cl$.

It is also possible to use several different aluminum halides. These aluminum halides can in particular be prepared by mixing trihydrocarbyl-aluminum compounds with aluminum halides containing more halogen than the halide which it is desired to obtain.

The solid catalyst complexes of the invention can be prepared from the above reactants (1), (2), (3) and (4) in accordance with any methods which induce a chemical reaction between them as are conventionally known.

It is preferred to carry out the complex-forming reaction in a liquid medium. If the reactants are not themselves liquid under the working conditions or if there is not a sufficient amount of liquid reactants, it is possible to include a liquid diluent. If a diluent is used, it is generally chosen from among those which are capable of dissolving at least one of the reactants and in particular from among the alkanes, cycloalkanes and aromatic hydrocarbons containing from 4 to 20 carbon atoms, such as, for example, isobutane, hexane, heptane, cyclohexane, benzene, toluene and the like. It is also possible to use polar solvents such as ethers and alcohols containing from 1 to 12 carbon atoms (for example ethanol and diethyl ether), tetrahydrofurane, pyridine, methylene chloride and the like. If a diluent which dissolves at least one of the reactants is used, it is preferred that the total concentration of the reactant or reactants dissolved should be above 5% by weight and preferably above 20% by weight relative to the diluent.

In all cases, whether a diluent is used or whether sufficient liquid reactants are present under the working conditions, the reaction mixture is preferably in the form of a relatively viscous liquid in which solids can be present.

The order of addition of the reactants is optional. In particular, the zirconium compounds (Z) and titanium compounds (T) can be introduced into the reaction mixture at any stage of the preparation of the solid catalyst complex. For reasons of convenience, it is, however, preferred to prepare solid catalyst complexes of the present invention in accordance with one of the following methods, the reactants being chosen suitably.

(I) Reactant (1) and a mixture of reactants (2) and (3) are brought together. The mixture is in a liquid form without the aid of a diluent. The mixture and reactant (1) are gradually mixed together or one is added to the other. Reactant (4) is then gradually added to the reaction mixture, which has preferably been rendered homogeneous and to which a diluent, as defined above, may have been added. This method is generally preferred if reactant (3) can be dissolved in reactant (2), the latter frequently being in the liquid state under relatively mild temperature and pressure conditions. The method is particularly applicable if reactant (3) is an oxygen-containing organic zirconium compound.

(II) Reactant (1) and reactant (2) are brought together in the absence of a diluent. Then, reactant (3) is added to the formed mixture, which has preferably been rendered homogeneous and to which a diluent, as defined above may have been added. Reactant (4) is then added gradually as in the first method. This method is particularly applicable if reactant (3) cannot be readily dissolved in the mixture of reactants (1) and (2) and is preferred if reactant (3) is a halogen-containing zirconium compound.

These methods (I) and (II) are preferred if reactant (2) is an oxygen-containing organic titanium compound.

If a halogen-containing titanium compound (T) is used, it is preferred to employ the following method.

(III) Reactant (1) and reactant (3) are mixed either gradually or by introducing one into the other. Reactant (4) is then gradually added as in the first method. Finally, reactant (2) is added.

The temperature and the pressure at which the preparation is carried out are not critical. For reasons of convenience, the process is generally carried out at between about −50° C. and 200° C., preferably between ambient temperature (25° C.) and 150° C., and under atmospheric pressure. In general, the reaction mixture is stirred so as to assist its homogenisation over the duration of the reaction.

Finally, the speed of addition of the reactants and the period of time for which they are in contact are also not critical. A speed is generally chosen which would not cause abrupt heating of the reaction mixture due to possible running-away of the reaction. The duration can generally vary between about 5 minutes to 12 hours. The reaction can be carried out continuously or discontinuously.

Regardless of the method chosen, the reactant (3) is preferably employed in the solid form, which is the form in which it is most commonly encountered under normal temperature and pressure conditions. It can also be used as a suspension or solution in a diluent such as defined above.

The amounts of reactants to be employed are critical.

The compounds (M), (T), (Z) and (A) must be employed in such amounts as to satisfy the equation $$(Zr/Ti) \times (X/Mg + Zr + Ti) > 3 \qquad (a)$$

The terms, Mg, Zr, Ti and X, respectively represent the total amounts of magnesium, zirconium, titanium and halogen employed. These amounts are expressed in gram equivalents. Taking into account the nature of the compounds (M), (T), (Z) and (A), it is found that the halogen is in every case introduced by the halide (A) but can also be introduced by the compounds (M), (T) and (Z) if these contain halogen. Accordingly, the total amount of halogen is to be understood to stand for the amount of halogen originating, without distinction, from all the reactants employed. Furthermore, gram equivalent (gm-equiv) is to be understood as the weight, expressed in grams, of the gram atom of the element considered, divided by its valency in the compound in question.

Accordingly, to obtain the catalyst complexes according to the present invention, it is necessary for the reactants to be employed in such a way as to satisfy the equation (a).

The product defined by equation (a) must be at least equal to 3. Preferably, this product is above 3.5. The best results are obtained if the product is above 4. There is no critical upper limit which the product must not exceed. However, in practice it is less than 80 and most frequently less than 40.

If the product defined by equation (a) has a value of less than 3, the catalyst complexes do not lose any of their properties with the sole exception of the fact that they no longer make it possible to manufacture polymers with a wide distribution of molecular weights.

The above equation (a) is the only one which is critical in the choice of the amounts of compounds (M), (T), (Z) and (A). However, for practical reasons, this choice is also preferably made so as to take into account the following equation:

$$(X/Mg + Ti + Zr) > 1 \qquad (b)$$

Preferably, the ratio defined by equation (b) is between 1.5 and 10. The best results are obtained when this ratio is between 2 and 8. In fact, when the ratio defined by equation (b) is too low, it is necessary to employ very large quantities of compound (Z) so as to satisfy equation (a). When it is too high, it is necessary to employ, in the polymerization, large amounts of a molecular weight modifier (for example hydrogen) so that the average molecular weight of the polymer should be acceptable.

Equally, it is preferred to choose the amounts of the compounds (Z) and (T) so as to satisfy the equations $$Zr/Ti > 0.1 \qquad (c)$$

The ratio defined by the equation (c) is in general between 0.5 and 5. In fact, for values of the ratio which are too low, the amount of compound (A) to be employed is too high. For values of the ratio which are too high, the average molecular weight of the polymer is too high.

Finally, the total amount of the compounds (T) and (Z) to be used is also chosen in relation to the amount of compound (M) used, taking into account the fact that too high a total amount of these compounds is detrimental to the productivity of the catalyst system and that too low an amount presents difficulties in preparation. This amount is preferably chosen so as to satisfy the equation $$0.1 < (Ti + Zr/Mg) < 10 \qquad (d)$$

The best results are obtained when:

$$0.5 < (Ti + Zr/Mg) < 5$$

The catalyst complexes prepared in accordance with the invention are solid. They are insoluble in the alkanes and cycloalkanes which can be used as diluents. They can be used for polymerization in the form in which they are obtained, without being separated from the reaction mixture. However, they can be separated from this reaction mixture, especially if they are prepared in the presence of a polar solvent, using any known means. For example, if the reaction mixture is liquid, it is possible to proceed by filtering, decanting or centrifuging.

After separation, the catalyst complexes can be washed so as to remove the excess reactants with which they may still be impregnated. For this wash, any inert diluent can be used including, for example, those mentioned above which can be used as constituents of the reaction mixture, such as the alkanes and the cycloalkanes. After washing, the catalyst complexes can be dried, for example, by sweeping a stream of dry nitrogen over them, or by drying in vacuo.

The mechanism of the reaction in which the catalyst complexes of the present invention is formed is not known. Elementary analysis of the catalyst complexes, after they have been isolated and washed, shows that they are indeed chemically bonded complexes, that is to say products of chemical reactions and not products resulting from mixing or from absorption phenomena. In fact, it is impossible to remove any one of the constituents used to form these complexes by purely physical methods of separation.

The catalyst systems according to the invention also contain an organometallic compound which serves as an activator. The organometallic compounds of the metals of Groups Ia, IIa, IIb, IIIb and IVb of the Periodic Table, such as the organometallic compounds of lithium, magnesium, zinc, aluminum or tin, may be used. The best results are obtained with the organo-aluminum compounds.

The activator can be formed from completely alkylated compounds wherein the alkyl chains contain from 1 to 20 carbon atoms and are straight or branched, such as, for example, n-butyl-lithium, diethyl-magnesium, diethyl-zinc, trimethyl-aluminum, triethyl-aluminum, triisobutyl-aluminum, tri-n-butyl-aluminum, tri-n-decyl-aluminum, tetraethyl-tin and tetrabutyl-tin. However, it is preferred to use trialkyl-aluminums wherein the alkyl chains contain from 1 to 10 carbon atoms and are straight or branched.

Further, it is possible to use as the activator compound the hydrides of metal-alkyls in which the alkyl radicals also contain from 1 to 20 carbon atoms, such as diisobutyl-aluminum hydride and trimethyl-tin hydride. Suitable activators also include the metal-alkyl halides, in which the alkyl radicals again contain from 1 to 20 carbon atoms, such as ethyl-aluminum dichloride, diethyl-aluminum chloride and diisobutyl-aluminum chloride.

Finally, it is also possible to use organo-aluminum compounds obtained by reacting aluminum trialkyls or dialkyl-aluminum hydrides, wherein the radicals contain from 1 to 20 carbon atoms, with diolefins containing from 4 to 20 carbon atoms, and more especially the compounds called aluminum-isoprenyls.

The process of the invention is applicable to the polymerization of olefins with terminal unsaturation in which the molecule contains from 2 to 20, preferably from 2 to 6, carbon atoms, such as ethylene, propylene, 1-butene, 4-methyl-1-pentene and 1-hexene. It is also applicable to the copolymerization of these olefins with one another as well as with diolefins containing preferably from 4 to 20 carbon atoms. These diolefins can be unconjugated aliphatic diolefins such as 1,4-hexadiene; monocyclic diolefins, such as 4-vinylcyclohexene, 1,3-divinylcyclohexane, cyclopentadiene or 1,5-cyclooctadiene; alicyclic diolefins having an endocyclic bridge, such as dicyclopentadiene or norbornadiene; and conjugated aliphatic diolefins such as butadiene and isoprene.

The process of the invention is particularly applicable for the manufacture of ethylene homopolymers and of copolymers containing at least 90 mol %, and preferably 95 mol %, of ethylene.

The polymerization can be carried out in accordance with any known process, such as in solution or in suspension, in a hydrocarbon solvent or diluent, or in the gas phase. When the process is carried out in solution or in suspension, solvents or diluents similar to those employed for the preparation of the catalyst complex are used. These solvents or diluents are preferably alkanes or cycloalkanes, such as isobutane, pentane, hexane, heptane, cyclohexane, methylcyclohexane or their mixtures. It is also possible to carry out the polymerization in the monomer or in one of the monomers, kept in the liquid state.

The polymerization pressure is generally between atmospheric pressure and 100 kg/cm$^2$, preferably up to about 50 kg/cm$^2$. The temperature is generally chosen between 20° and 200° C. and preferably between 60° and 120° C. The effect of the catalyst complexes according to the invention on the broadening of the molecular weight distribution of the polymer is particularly marked between about 70° to 80° C. The polymerization can be carried out continuously or discontinuously.

The organometallic compound and the catalyst complex can be added separately to the polymerization medium. They can also be brought into contact at a temperature of between −40° and 80° C. for a period which can be up to 2 hours before introducing them into the polymerization reactor. They can also be brought into contact in several stages, or a part of the organometallic compound can be added before the reactor, or several different organometallic compounds can be added.

The total amount of organometallic compound employed can vary widely. It is generally between 0.02 and 50 mmols per dm$^3$ of solvent, of diluent or of reactor volume and preferably between 0.5 and 2.5 mmols per dm$^3$. It has been found that when this amount of organometallic compound is in the lower part of this range, and no comonomer is added, polyethylenes of which the specific gravity is in the range of medium specific gravities, that is to say between 0.940 and 0.950 kg/dm$^3$, are obtained. Furthermore, excessively large amounts of organometallic compound in the polymerization medium can, in certain cases, lead to an encrusting of the polymerization reactor.

The amount of catalyst complex employed is decided in accordance with the titanium content and zirconium content of the catalyst complex. It is generally chosen so that the concentration should be between 0.001 and 2.5, and preferably between 0.01 and 0.25, milli-gram atom of titanium and of zirconium per dm$^3$ of solvent, of diluent or of reactor volume.

The ratio of the amounts of organometallic compound and of catalyst complex is also not critical. It is generally so chosen that the ratio of organometallic compound/titanium+zirconium, expressed in mol/-gram atom is greater than 1 and preferably greater than 10.

The average molecular weight, and hence the melt index, of the polymers manufactured according to the process of the invention can be further regulated by adding to the polymerization medium one or more molecular weight modifiers such as hydrogen, zinc or cadmium diethyl, alcohols or carbon dioxide.

The specific gravity of the homopolymers manufactured according to the process of the invention can also be regulated by adding to the polymerization medium an alkoxide of a metal of Groups IVa and Va of the Periodic Table. Thus, polyethylenes of specific gravity intermediate between that of conventional high density polyethylenes and that of polyethylenes prepared according to a high pressure process can be manufactured.

The alkoxides of titanium and of vanadium, wherein the organo radicals each contain from 1 to 20 carbon atoms, are particularly effective in regulating the specific gravity of the polymer formed. Examples of these include, $Ti(OCH_3)_4$, $Ti(OC_2H_5)_4$, $Ti[OCH_2CH(CH_3)_2]_4$, $Ti(OC_8H_{17})_4$ and $Ti(OC_{16}H_{33})_4$.

The process of the invention permits the manufacture of polyolefins with very high productivities. Thus, in the homopolymerization of ethylene, the productivity, expressed in grams of polyethylene per gram of catalyst complex employed, regularly exceeds 3,000, and in certain cases 10,000. The activity, relative to the amount of transition metals present in the catalyst complex, is also very high. In the homopolymerization of ethylene the activity, also expressed in grams of polyethylene, per gram atom of titanium and of zirconium employed, regularly exceeds 200,000. In the most favorable cases, it is greater than 500,000.

As a result of the above facts, the content of catalyst residue present in the polymers manufactured according to the process of the invention is extremely low. More particularly, the content of residual transition metals (zirconium and titanium) is extremely low. In this context it should be noted that it is the derivatives of the transition metals which are most objectionable in the catalyst residues, due to the colored complexes which they form with the phenolic antioxidants usually employed in polyolefins, and because of the toxic character of these metals.

In the process of the invention, the content of objectionable residues in the polymers is so low that it is possible to dispense with the purification treatment (for example a treatment with alcohol), which is essential if the content of catalyst residues is high, and which is a costly operation in respect of starting materials and energy and, therefore, requires considerable investments.

In addition to their extremely wide molecular weight distribution, the polyolefins manufactured according to the invention are characterized by an exceptionally high stress crack resistance. Thus, the polymers of ethylene manufactured in accordance with the invention have a stress crack resistance, measured according to Standard Specification ASTM D-1693 (Bell Test) of greater than 1,000 hours. The polymers of ethylene manufactured under the same conditions by means of the high activity catalyst systems described in Belgain Pat. No. 791,676 do not have a stress crack resistance, measured in accordance with the same standard specification, greater than about 50 hours.

The polyolefins obtained according to the process of the present invention can be employed in accordance with all the known molding techniques, for example by extrusion, by injection, by extrusion-blowing or by calendering. Their wide molecular weight distribution, combined with a relatively high average molecular weight, makes them particularly suitable for molding by extrusion and by extrusion-blowing. For example, they can be used for the manufacture of pipes and containers.

The following examples are given to illustrate the best modes for carrying out the present invention but are not to be construed as restricting the scope thereof.

EXAMPLES 1 to 5

The following reactants were used:
(1) magnesium ethylate (Mg(OC$_2$H$_5$)$_2$ sold by Dynamit Nobel.
(2) titanium tetrabutylate Ti(OnC$_4$H$_9$)$_4$ sold by Dynamit Nobel.
(3) zirconium tetrabutylate Zr(OnC$_4$H$_9$)$_4$ sold by Dynamit Nobel (in the form of a viscous liquid containing about 14%, by weight, free butyl alcohol).
(4) ethyl-aluminium dichloride, Al(C$_2$H$_5$)Cl$_2$, sold by Schering.

15.2 g of reactant (3) and 13.5 g of reactant (2) were added to 9 g of reactant (1) and the mixture obtained was then heated at 145° C. for 150 minutes without removing the free alcohol which accompanied reactant (3). This mixture was then dissolved in about 250 ml of hexane. In this mixture, the ratio (c) [Zr/Ti] is about 0.9 gram-quivalent/gram equivalent and the ratio (d) [Zr+Ti/Mg] is about 1.9 gram-equivalent/gram-equivalent, accurate to ±10% due to the impurities contained in the reactants. Varying amounts of reactant (4) were added to portions of the solution thus obtained. Reactant (4) was added, while stirring, in the form of a 50% strength by weight solution in hexane, in such a way as to maintain the temperature of the mixture at about 60° C. The suspension (a) obtained was left standing for about 1 hour at 65° C. The catalyst complex thus formed in the reaction mixture was solid. The solid complex was separated off, washed with hot hexane (±60° C.) and dried in vacuo for about 3 hours (±60° C.).

Varying amounts of catalyst complex and triisobutylaluminium were introduced into a 1.5 l autoclave containing 0.5 l of hexane. The temperature of the autoclave was then raised to about 85° C. Ethylene under a partial pressure of 10 kg/cm$^2$ and hydrogen under varying partial pressures were introduced.

The polymerization was continued for 1 hour with stirring and keeping the total pressure constant by continuous addition of ethylene. After 1 hour, the autoclave was let down and the polyethylene (PE) thus produced was collected.

Table I shows the particular conditions of each experiment as well as the results obtained.

TABLE I

| Example No. | 1 | 2 | 3 | 4 | 5 |
|---|---|---|---|---|---|
| Product (a) [(Zr/Ti) × (X/Mg + Zr + Ti)] | 1.8 | 3 | 4.6 | 5.2 | 6 |
| Elementary analysis of the catalyst complex employed | | | | | |
| Mg (mg/g) | 68 | 59 | 41 | 24 | 23 |
| Ti (mg/g) | 57 | 72 | 107 | 137 | 132 |
| Zr (mg/g) | 112 | 127 | 138 | 123 | 130 |
| Al (mg/g) | 27 | 29 | 22 | 25 | 22 |
| Cl (mg/g) | 512 | 618 | 588 | 596 | 562 |
| Amount of catalyst complex employed (mg) | 10 | 11 | 18 | 10 | 14 |
| Amount of triisobutyl-aluminium employed (mg) | 200 | 200 | 100 | 100 | 200 |
| Partial pressure of hydrogen (kg/cm$^2$) | 2* | 6 | 15 | 15 | 15 |
| Amount of PE obtained (g) | 58 | 64 | 89 | 45 | 66 |
| Productivity (g of PE/g of complex) | 2,320 | 5,820 | 4,940 | 4,500 | 4,710 |
| Melt index (MI) measured according to Standard Specification ASTM-D 1238-57 T (load: 2 16 kg) (g/10 minutes) | 0.33 | 0.17 | 0.26 | 0.26 | 0.35 |
| High load melt index (HLMI) measured according to Standard Specification ASTM-D 1238-57 T (load: 21.6 kg) (g/10 minutes) | 12.3 | 8.52 | 37 | 34 | 35.1 |
| Ratio HLMI/MI | 37 | 50 | 142 | 131 | 100 |

*for this experiment, the ethylene was introduced under a partial pressure of 5 kg/cm$^2$.

The results indicated in Table I show that the ratio of the high load melt index (HLMI) to the melt index (MI) of the polyethylene formed, which is representative of the spread of the molecular weight distribution (higher ratios are representative of broader molecular weight distributions), has the highest values when values of the product (a) is greater than 3. Example 1 shows that when the catalyst complex is formed from reactants in amounts such that the product (a) is less than 3 one does not obtain polymers characterized by a very wide molecular weight distribution.

EXAMPLE 6R

This example, given by way of comparison, was carried out repeating the polymerization experiment of Example 15 of Belgian Pat. No. 791,676, carried out in the presence of a solid catalyst complex prepared by employing the reactants (1) to (4) as described in Example 1 to 5 above in amounts which gave the following products and ratios:

(a) = (Zr/Ti) × (X/(Mg+Zr+Ti)) = 2.8
(b) = X/(Mg+Zr+Ti) = 2.1
(c) = Zr/Ti = 1.33
(d) = (Ti+Zr)/Mg = 1.4

The polymer obtained was characterized by an MI of 0.44 g/10 min. and an HLMI of 17.2 g/10 min. The ratio HLMI/MI, representative of the molecular weight distribution, was thus only 39.

It is seen that it is not sufficient that the equations (b), (c) and (d), which control the preparation of the catalyst complexes of the invention, should be satisfied, if the equation (a) is not also satisfied.

EXAMPLES 7 to 10

A series of catalyst complexes were prepared from the same reactants as in Examples 1 to 5, but adding a mixture, in varying proportions and in varying amounts, of the reactants (2) [Ti(OnC$_4$H$_9$)$_4$] and (3) [Zr(OnC$_4$H$_9$)$_4$] to about 0.1 mol of reactant (1), Mg(OC$_2$H$_5$)$_2$.

The preparation was then continued under the same conditions of Examples 1 to 5, and to the solutions obtained were added amounts of reactant (4) [Al(C$_2$H$_5$)Cl$_2$] such that the ratio (b) [X/(Zr+Ti+Mg)] is 3.3 (Examples 7–9) or 2.7 (Example 10).

The preparation of the catalyst complexes was carried out as indicated in Examples 1 to 5. The polymerization experiments were carried out with the catalyst complexes thus obtained in accordance with the same procedure mentioned in these examples.

Table II which follows lists the particular conditions of the preparation of the catalyst complexes, the particular conditions of the polymerization, and the results obtained. The ratios indicated are accurate to about ±10%.

TABLE II

| Example No. | 7 | 8 | 9 | 10 |
|---|---|---|---|---|
| Amount of reactant (1) used | 11.6 | 9 | 9 | 11.6 |
| Composition of the mixture of reactants (2) and (3) added to reactant (1): | | | | |
| amount of reactant (3)* (g) | 26.2 | 22.8 | 20.9 | 29.7 |
| amount of reactant (2) (g) | 11.6 | 6.7 | 5.4 | 7 |
| Ratio (c) [Zr/Ti] | 2 | 3 | 3.5 | 4 |
| Ratio (d) [(Zr + Ti)/Mg] | 2 | 2 | 1.8 | 2 |
| Amount of reactant (4) used (ml) | 320 | 250 | 250 | 250 |
| Product (a) | | | | |
| [Zr/Ti × X/(Mg + Zr + Ti)] | 6.6 | 9.9 | 11.6 | 10.8 |
| Elementary analysis of the solid catalyst complex | | | | |
| Mg (mg/g) | 60 | 63 | 63 | 66 |
| Ti (mg/g) | 45 | 35 | 31 | 29 |
| Zr (mg/g) | 167 | 195 | 188 | 194 |

TABLE II-continued

| Example No. | 7 | 8 | 9 | 10 |
|---|---|---|---|---|
| Al (mg/g) | 26 | 35 | 30 | 26 |
| Cl (mg/g) | 553 | 596 | 613 | 568 |
| Amount of catalyst complex employed (mg) | 20 | 15 | 26 | 15 |
| Amount of triisobutyl-aluminium employed (mg) | 100 | 200 | 200 | 200 |
| Partial pressure of hydrogen (kg/cm$^2$) | 15 | 15 | 15 | 15 |
| Amount of PE obtained (g) | 138 | 60 | 93 | 66 |
| Productivity (g of PE/g of complex) | 6,900 | 4,000 | 3,580 | 4,400 |
| Melt index MI (g/10 min.) | 0.19 | 0.11 | 0.24 | 0.43 |
| High load melt index HLMI (g/10 min.) | 14.37 | 10.01 | 21.9 | 33.38 |
| Ratio HLMI/MI | 76 | 91 | 91 | 78 |

*without taking into account the amount of free butyl alcohol present

Once again, the great broadening of the molecular weight distribution imparted to the polymers obtained by the use of these catalyst systems is observed.

EXAMPLE 11

A solid catalyst complex was prepared from the same reactants as in Examples 7 to 10, employing them in such a way that the ratios (b), (c) and (d) and the product (a) are the same as in Example 10. The method of preparation which was followed was the same as in Examples 7 to 10, except that the free butyl alcohol present is removed from the reaction mixture by heating before adding the reactant (4). Elementary analysis showed that the solid catalyst complex obtained contained, per kg, 69 g of Mg, 176 g of Zr, 25 g of Ti, 23 g of Al and 565 g of Cl. A polymerization experiment, carried out under the same general conditions as in Examples 1 to 5, with 16 mg of complex and 100 mg of triisobutyl-aluminium, and under a partial hydrogen pressure of 15 kg/cm$^2$, yielded 93 g of a polyethylene of MI=0.19 and of HLMI=16.9 g/10 min. The HLMI/MI ratio was accordingly 89. The productivity of the catalyst is 5,840 g of PE/g of complex.

EXAMPLE 12

A solid catalyst complex was prepared from the same reactants and in accordance with the same technique of preparation as in Examples 1 to 5, but employing the reactants (1) to (4) in such a way as to give the following products and ratios:

(a) = (Zr/Ti) × (X/(Mg+Zr+Ti)) = 31.3
(b) = X/(Mg+Zr+Ti) = 2.5
(c) = Zr/Ti = 12.5
(d) = (Ti+Zr)/Mg = 3

Elementary analysis showed that the solid catalyst complex obtained contained per kg, 66 g of Mg, 229 g of Zr, 13 g of Ti, 41. g of Al and 574 g of Cl. A polymerization experiment, carried out under the same general conditions as in Examples 1 to 5, with 24 mg of complex and 200 mg of triisobutyl-aluminium and under a partial pressure of hydrogen of 15 kg/cm$^2$, yielded 86 g of a polyethylene of MI 0.26 and of HLMI 17.7 g/10 min. Accordingly, the ratio HLMI/MI was 68. The productivity of the catalyst was 3,580 g of PE/g of complex.

EXAMPLE 13

A solid catalyst complex was prepared from the same reactants and in accordance with the same technique of preparation as in Examples 1 to 5, but employing the reactants (1) to (4) in such a way as to give the following products and ratios:

(a)=(Zr/Ti)×(X/(Mg+Zr+Ti))=5
(b)=X/(Mg+Zr+Ti)=10
(c)=Zr/Ti=0.5
(d)=(Ti+Zr)/Mg=2

The solid catalyst complex obtained contained per kg, 6.3 g of Mg, 99 g of Zr, 174 g of Ti, 26 g of Al and 573 g of Cl. A polymerization experiment, carried out under the same general conditions as in Examples 1 to 5, with 14 mg of complex and 200 mg of triisobutyl-aluminium and under a partial pressure of hydrogen of 5 kg/cm², yielded 43 g of a polyethylene of MI 0.50 and of HLMI 25.1 g/10 min. Accordingly, the ratio HLMI/MI was 50. The productivity of the catalyst was 3,750 g of PE/g of complex.

EXAMPLE 14

A catalyst complex was prepared in the same manner as in Example 9 but without isolating it from the suspension obtained after adding the reactant (4). 8 ml of this suspension were introduced into the polymerization autoclave for a polymerization experiment carried out under the general conditions of Examples 1 to 5 with 400 mg of triisobutyl-aluminium and under a partial pressure of hydrogen of 15 kg/cm². 90 g of polyethylene of MI=0.38 and of HLMI=31 g/10 min. was obtained. The HLMI/MI ratio was, thus, 82.

EXAMPLE 15

A catalyst complex was prepared from the same reactants as in Examples 7 to 10, and employing the reactants (1), (2) and (3) in such a way that the ratios (c) and (d) were the same as in Example 10. After removing the free butyl alcohol, as indicated in Example 11, the mixture obtained from these reactants was dissolved in hexane and was added in four successive lots to a 50% strength, by weight, hexane solution of reactant (4). The temperature of the mixture was kept at about 65° C., the final ratio (b) being 3.6 and the product (a) being about 14.4. The treatment of the suspension obtained and of the catalyst complex which was subsequently isolated therefrom was carried out as mentioned in Examples 1 to 5.

Elementary analysis of the solid catalyst complex showed that it contained, per kg, 51 g of Mg, 195 g of Zr, 26 g of Ti, 32 g of Al and 544 g of Cl.

A polymerization experiment, carried out with 18 mg of this complex under the general conditions of Examples 1 to 5, but under a partial pressure of hydrogen of 15 kg/cm², yielded 98 g of a polyethylene of MI=0.06 and of HLMI=4.59 g/10 min. Accordingly, the HLMI/MI ratio is 77. The productivity of the catalyst is 5,450 g of PE/g of complex.

EXAMPLE 16

A catalyst complex was prepared using the same reactants (2), (3) and (4) as in Examples 1 to 5, but using analytical-grade MgCl₂, sold by British Drug House and containing 24 g of H₂O/kg, as reactant (1). The reactants were employed under the general conditions indicated in Examples 1 to 5, but in amounts which gave the following products and ratios:

(a)=Zr/Ti×X/(Zr+Ti+Mg))=6
(b)=X/(Zr+Ti+Mg)=3
(c)=Zr/Ti=2
(d)=(Zr+Ti)/mg=2

The preparation was carried out as indicated in Examples 1 to 5. The catalyst complex obtained contained, per kg, 60 g of Mg, 178 g of Zr, 48 g of Ti, 23 g of Al and 600 g of Cl.

A polymerization experiment, carried out under the same general conditions as in Examples 1 to 5, with 21 mg of complex and 200 mg of triisobutyl-aluminium, and under a partial pressure of hydrogen of 10 kg/cm², yielded 104 g of polyethylene of MI 0.17 and of HLMI 13.9 g/10 min. Accordingly, the ratio HLMI/MI was 82. The productivity of the catalyst was 4,950 g of PE/g of complex.

EXAMPLE 17

A catalyst complex was prepared from the same reactants as in Examples 1 to 5 except that reactant (2) was TiCl₄ sold by Titangesellschaft. The preparation was carried out as indicated in Examples 1 to 5 except that the reactant (2) is added to the suspension after adding the reactant (4). After keeping this mixture at 65° C. for 1 hour, the solid catalyst complex was washed and dried as indicated in Examples 1 to 5. The amounts in which the reactants were employed were such that:

(a)=(Zr/Ti)×(X/(Zr+Ti+Mg))=4.2
(b)=X/(Zr+Ti+Mg)=2.1
(c)=Zr/Ti=2
(d)=(Zr+Ti)/Mg=3

The catalyst complex obtained contained, per kg, 53 g of Mg, 172 g of Zr, 51 g of Ti, 17 g of Al and 527 g of Cl.

A polymerization experiment, carried out under the same general conditions as in Examples 1 to 5, with 20 mg of complex and 200 mg of triisobutyl-aluminium under a partial pressure of hydrogen of 15 kg/cm², yielded 78 g of polyethylene of MI 0.18 and HLMI 17.34 g/10 min. Accordingly, the ratio HLMI/MI was 96. The productivity of the catalyst was 3,900 g of PE/g of complex.

EXAMPLES 18 to 22

The same reactants (1), (2) and (4) as in Examples 1 to 5 are used, but zirconium tetrachloride, ZrCl₄, sold by Dynamit Nobel, was used as the reactant (3).

114 g of reactant (1) was added to 136 g of reactant (2). The mixture was heated at 140° C. for 4 hours while stirring and it was found that the reactant (1) substantially completely dissolved in reactant (2). In the mixture, the atomic ratio Ti/Mg was 0.8 gram equivalent/-gram equivalent to an accuracy of ±10%.

The mixture thus produced was brought to a volume of one litre by adding hexane and was heated under refulx for 1 hour. Thereafter, varying amounts of ZrCl₄, in the form of a powder suspended in hexane, was added to 100 ml portions, respectively, of the solution thus obtained. The suspension obtained was heated under refulx for 1 hour. Finally, varying amounts of reactant (4) were added slowly, while stirring, in such a way as to keep the temperature of the mixture at about 50° to 55° C. The reactant (4) was added in the form of a 50% strength by weight solution in hexane. The contact with the reactant (4) was maintained for about 15 minutes after the reactant was added.

The catalyst complexes thus formed in the reaction mixture were solid. They were each separated off, washed with hot hexane (60° C.) and dried to constant weight in vacuo (60° C.).

Polymerization experiments were carried out under the general conditions of Examples 1 to 5.

The characteristics of the preparation of the catalyst complexes, the particular polymerization conditions and the results obtained are summarized in Table III below.

TABLE III

| Example No. | 18 | 19 | 20 | 21 | 22 |
|---|---|---|---|---|---|
| Ratio (c) [Zr/Ti] | 1.5 | 2 | 3 | 4 | 6 |
| Ratio (d) [(Zr + Ti)/Mg] | 2 | 2.4 | 3.2 | 4 | 5.6 |
| Ratio (b) [X/(Mg + Zr + Ti)] | 5.4 | 3.4 | 2 | 1.84 | 1.6 |
| Product (a) [Zr/Ti × X/(Zr + Ti + Mg)] | 8.1 | 6.8 | 6 | 7.4 | 9.6 |
| Elementary analysis of the solid catalyst complex | | | | | |
| Mg (mg/g) | 60 | 38 | 45 | 43 | 33 |
| Ti (mg/g) | 101 | 62 | 38 | 33 | 22 |
| Zr (mg/g) | 169 | 200 | 234 | 239 | 260 |
| Al (mg/g) | 20 | 19 | 22 | 14 | 14 |
| Cl (mg/g) | 603 | 613 | 591 | 587 | 565 |
| Amount of catalyst complex employed (mg) | 34 | 42 | 37 | 24 | 70 |
| Partial pressure of hydrogen (kg/cm$^2$) | 8 | 15 | 8 | 12 | 15 |
| Amount of PE obtained (g) | 134 | 140 | 110 | 85 | 111 |
| Productivity (g of PE/g of complex) | 3,940 | 3,330 | 2,970 | 3,540 | 1,590 |
| MI (g/10 min.) | 0.17 | 0.3 | 0.22 | 0.13 | 0.26 |
| HLMI (g/10 min.) | 12.97 | 29.48 | 15.5 | 9.36 | 13.84 |
| HLMI/MI | 76 | 98 | 70 | 72 | 53 |

EXAMPLE 23

The copolymerization of ethylene with butene was carried out with a solid catalyst complex of Example 9. The general conditions of the polymerization were the same as in Examples 1 to 5. The particular conditions, and the results, are shown below:

Amount of catalyst complex introduced into the autoclave: 20 mg

Partial pressure of hydrogen: 15 kg/cm$^2$

Amount of comonomer introduced: 0.1 mol of n-butene-1 dried over alumina

Amount and nature of the activator: 200 mg of triisobutyl-aluminium

Amount of copolymer obtained: 81 g

Catalyst productivity: 4,050 g of copolymer/g of catalyst complex

MI of the copolymer: 0.5 g/10 min.

HLMI of the copolymer: 40.6 g/10 min.

Ratio HLMI/MI: 81

Specific gravity of the copolymer: 0.952 kg/dm$^3$.

While the invention has been described in connection with preferred embodiments, it is not intended to limit the invention to the particular forms set forth, but on the contrary, it is intended to cover such alternatives, modifications, and equivalents as may be included within the spirit and scope of the invention as defined by the appended claims.

We claim:

1. In a solid catalyst complex comprising the reaction product formed from reacting together
   (1) at least one magnesium compound (M) selected from oxygen-containing organic compounds of magnesium and halogen containing compounds of magnesium; with
   (2) at least one titanium compound (T) selected from oxygen-containing organic compounds of titanium and halogen containing compounds of titanium; with
   (3) at least one zirconium compound (Z) selected from oxygen-containing organic compounds of zirconium and halogen containing compounds of zirconium; and with
   (4) at least one aluminum halide (A) of the formula AlR'$_n$X$_{3-n}$ wherein R' is a C$_1$-C$_{20}$ hydrocarbon, X is a halogen and n is a number such that $0 \leq n \leq 3$:

said oxygen containing organic compounds of magnesium, titanium and zirconium contain at least one metal-oxygen-organic radical sequence and the organic radicals contain from 1 to 20 carbon atoms; said halogen-containing compounds of magnesium, titanium, and zirconium contain at least one halogen to metal bond sequence; the improvement wherein said compounds (M), (T), (Z) and (A) are used in amounts that satisfies the equation $$(Zr/Ti) \cdot (X/Mg + Zr + Ti) > 3$$

where Mg, Zr, Ti and X represent the amounts, in gram-equivalents, of magnesium, zirconium, titanium and halogen of said compounds.

2. The solid catalyst complex of claim 1 wherein the equation $$(Zr/Ti) \cdot (X/Mg + Zr + Ti)$$

has a value greater than 3.5.

3. The solid catalyst complex of claim 1 wherein the equation $$(X/Mg + Zr + Ti) > 1$$

further defines the amount of compounds (M), (T), (Z) and (A) used.

4. The solid catalyst complex of claim 1 wherein the equation $$Zr/Ti > 0.1$$

further defines the amount of compounds (T) and (Z) used.

5. The solid catalyst complex of claim 1 wherein the compounds (M), (T), (Z) and (A) are each used in amounts such that the equations $$3.5 < (Zr/Ti) \cdot (X/Mg + Zr + Ti) < 80 \quad (2)$$

$$1.5 < X/Mg + Zr + Ti < 10 \quad (b)$$

and $$0.5 < Zr/Ti < 5$$

are satisfied.

6. The solid catalyst complex of claim 5 wherein the equation (a) has a value of from greater than 4 to less than 40; equation (b) has value of from greater than 2 to less than 8; equation (c) has a value of from greater than 0.5 to less than 5 and the amounts of compounds (M), (Z) and (T) are such that the equation $$0.5 < Ti + Zr/Mg < 5$$

is satisfied.

7. The catalyst complex of claim 1 wherein the compound (M) is selected from magnesium alkoxides and phenoxides.

8. The catalyst complex of claim 1 wherein the compound (M) contains at least one Mg to Cl bond.

9. The catalyst complex of claim 1 wherein the compound (T) is $TiCl_4$.

10. The catalyst complex of claim 1 wherein compound (T) is titanium tetraalkoxide.

11. The catalyst complex of claim 1 wherein compound (Z) is an alkoxide of tetravalent zirconium.

12. The catalyst complex of claim 1 wherein compound (Z) is $ZrCl_4$.

13. The catalyst complex of claim 1 wherein compound (M) is selected from magnesium alkoxide and phenoxide; compound. (T) is selected from titanium tetrachloride and titanium tetraalkoxides; compound (Z) is selected from tetraalkoxides, tetrachlorides and alkoxychlorides of zirconium; and compound (A) corresponds to the formula $AlR'_n X_{3-n}$ wherein R' is a $C_1$ to $C_6$ hydrocarbon, X is chlorine and n is 1.

14. A catalyst for the polymerization of α-olefins comprising an organic-metallic compound of a metal of Groups Ia, IIa, IIb, IIIb and IVb of the Periodic Table and the solid catalyst complex of claim 1.

15. A catalyst for the polymerization of α-olefins comprising an organic-metallic compound of a metal of Groups Ia, IIa, IIb, IIIb and IVb of the Periodic Table and the solid catalyst complex of claim 13.

16. In a process for the preparation of a solid catalyst complex comprising reacting with one another the reactants comprising (1) at least one magnesium compound (M) selected from oxygen-containing organic compounds of magnesium and halogen containing compounds of magnesium; with (2) at least one titanium compound (T) selected from oxygen-containing organic compounds of titanium and halogen containing compounds of titanium; with (3) at least one zirconium compound (Z) selected from oxygen-containing organic compounds of zirconium and halogen containing compounds of zirconium; and with (4) at least one aluminum halide (A); p1 said oxygen containing organic compounds of magnesium, titanium and zirconium contain at least one metal-oxygen-organic radical sequence and the organic radicals contain from 1 to 20 carbon atoms; said halogen-containing compounds of magnesium, titanium and zirconium contain at least one halogen to metal bond sequence; the improvement wherein said compounds (M), (T), (Z) and (A) are used in amounts that satisfies the equation $$(Zr/Ti).(X/Mg+Zr+Ti)>3$$

where Mg, Zr, Ti and X represent the amounts, in gram-equivalents, of magnesium, zirconim, titanium and halogen of said compounds.

17. The process according to claim 16 wherein the reactants (1) to (3) are selected from oxygen-containing organic compounds, reactant (1) is added to a mixture of reactants (2) and (3) and then reactant (4) is added to the resultant mixture.

18. Process according to claim 16, wherein the reactants (1) and (2) are selected from oxygen-containing organic compounds, the reactant (3) is selected from halogen-containing compounds and reactant (3) is added to a mixture of reactants (1) and (2) and then reactant (4) is added to the resultant mixture.

19. Process according to claim 16, wherein the reactants (1) and (3) are selected from oxygen-containing organic compounds, reactant (2) is selected from halogen-containing compounds and reactant (2) is added to a mixture of reactants (1), (3) and (4).

20. The process of claim 16 wherein the aluminum halide is represented by the formula $AlR'_n X_{3-n}$ wherein R' is a $C_1$-$C_{20}$ hydrocarbon, X is a halogen and n is any number such that $0 < n < 3$.

* * * * *

UNITED STATES PATENT AND TRADEMARK OFFICE
CERTIFICATE OF CORRECTION

PATENT NO. : 4,192,772
DATED : March 11, 1980
INVENTOR(S) : Eugene Berger and Charles Bienfait It is certified that error appears in the above-identified patent and that said Letters Patent are hereby corrected as shown below:

Column 4, line 14, "$MgCl_2 \cdot 6CH_2OH$" should read --$MgCl_2 \cdot 6CH_3OH$--

Column 12, line 55, "2 16 kg" should read --2.16 kg--.

Column 18, line 58, delete "(2)" at the end of the formula and insert --(a)-- before the formula.

Column 18, line 59, delete "(b)" at the end of the formula and insert --(b)-- before the formula.

Column 18, line 63, insert --(c)-- before the formula.

Column 20, line 7, delete the notation "pl".

Signed and Sealed this

Sixth Day of April 1982

[SEAL]

Attest:

GERALD J. MOSSINGHOFF

Attesting Officer     Commissioner of Patents and Trademarks